United States Patent
Waters et al.

(10) Patent No.: US 7,314,034 B1
(45) Date of Patent: Jan. 1, 2008

(54) SYSTEM FOR VERIFYING CYLINDER DEACTIVATION STATUS IN A MULTI-CYLINDER ENGINE

(75) Inventors: James P. Waters, Waterford, MI (US); Kenneth M. Simpson, Swartz Creek, MI (US); Jon C. Darrow, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/656,787

(22) Filed: Jan. 23, 2007

(51) Int. Cl.
*F02D 13/06* (2006.01)
*G01L 3/26* (2006.01)

(52) U.S. Cl. .................... 123/198 F; 73/116
(58) Field of Classification Search ............ 123/198 F; 73/116
See application file for complete search history.

(56) References Cited

U.S. PATENT DOCUMENTS

| | | | |
|---|---|---|---|
| 4,922,148 A | 5/1990 | Kitamura | |
| 4,980,588 A | 12/1990 | Ogawa | |
| 5,655,485 A | 8/1997 | Kusase et al. | |
| 5,798,586 A | 8/1998 | Adachi | |
| 5,934,263 A | 8/1999 | Russ et al. | |
| 6,072,253 A | 6/2000 | Harpenau et al. | |
| 6,234,144 B1* | 5/2001 | Yamaguchi et al. | 123/399 |
| 6,701,282 B2 | 3/2004 | Ting et al. | |
| 6,760,656 B2 | 7/2004 | Matthews et al. | |
| 6,820,597 B1 | 11/2004 | Cullen et al. | |

\* cited by examiner

*Primary Examiner*—Noah P. Kamen
(74) *Attorney, Agent, or Firm*—Paul L. Marshall

(57) ABSTRACT

In a multi-cylinder internal combustion engine having intake valve deactivation apparatus providing de-activation of the intake valves of selected cylinders during engine operation, correct cylinder activation status is verified by measuring gas pressure in a conduit conducting combustion related gases through the cylinders of the engine, detecting consecutive pulses in the pressure due to predetermined activations of the intake valves, comparing the time periods between the consecutive pulses to reference time periods based on crankshaft position and corresponding to expected time periods between the consecutive pulses and providing verification signals and cylinder identification of faulty intake valve deactivation or activation in response to the comparisons.

6 Claims, 3 Drawing Sheets

SYSTEM FOR VERIFYING CYLINDER DEACTIVATION STATUS IN A MULTI-CYLINDER ENGINE

TECHNICAL FIELD

This invention relates to multi-cylinder, internal combustion engines having selective intake valve de-activation apparatus.

BACKGROUND OF THE INVENTION

Cylinder deactivation may be used for fuel economy enhancement in a multi-cylinder, internal combustion engine wherein the intake valves are disabled in the closed position for selected cylinders, typically alternate cylinders in firing order. It is desirable to verify on such an engine that the cylinder deactivation system is working correctly: that is, that the cylinders are actually activated or de-activated in accordance with the commands of the de-activation control apparatus.

One method of verification known in the art is based on comparing a low-pass filtered (average) value of intake manifold absolute pressure (MAP) with an expected value based on engine operating conditions such as engine speed, load and cylinder de-activation mode, with a difference exceeding a threshold indicating an error. Although sound in theory, since the sensed value changes depending on how many cylinders are activated, it is difficult to make reliable determinations in practice due to two shortcomings. The first is in the determination of useful threshold values, since the ranges of expected values of filtered MAP for different numbers of activated cylinders in (1) properly functioning and (2) malfunctioning intake-side cylinder deactivation apparatus are often insufficiently spaced for reliable distinction and may even overlap. The second is that the signal time delay resulting from the low-pass filtering makes it difficult or impossible to determine the identity of the malfunctioning valve or valves.

The object of this invention is thus to provide a method for verifying cylinder activation status in an engine having selective intake valve activation that is not subject to the shortcomings mentioned above.

SUMMARY OF THE INVENTION

The method of this invention overcome the two shortcomings of the prior art by monitoring the periodic, engine-synchronous fluctuating signal of a pressure of combustion related gasses through the cylinders of an engine to determine the time periods between pulses in this signal due to activations of intake valves and comparing these time periods to a reference time period based on crankshaft position. When a valve is de-activated, the pulse that would have occurred with an activation of that valve does not occur; and the time period between consecutive sensed pulses (from the previous and following cylinders in firing order) in air pressure is twice that which occurs with normal activation. Thus, by monitoring the time periods between consecutive pulses and comparing these time periods to reference time periods based on crankshaft position, the intake valve activation status of each cylinder may be detected. The method is more robust than attempting to determine such errors directly from heavily low-pass filtered, average amplitude values of the air pressure; and it further provides significantly shorter time delays for easier identification of the specific cylinder that is malfunctioning.

DESCRIPTION OF THE PREFERRED EMBODIMENT

Figure 1:
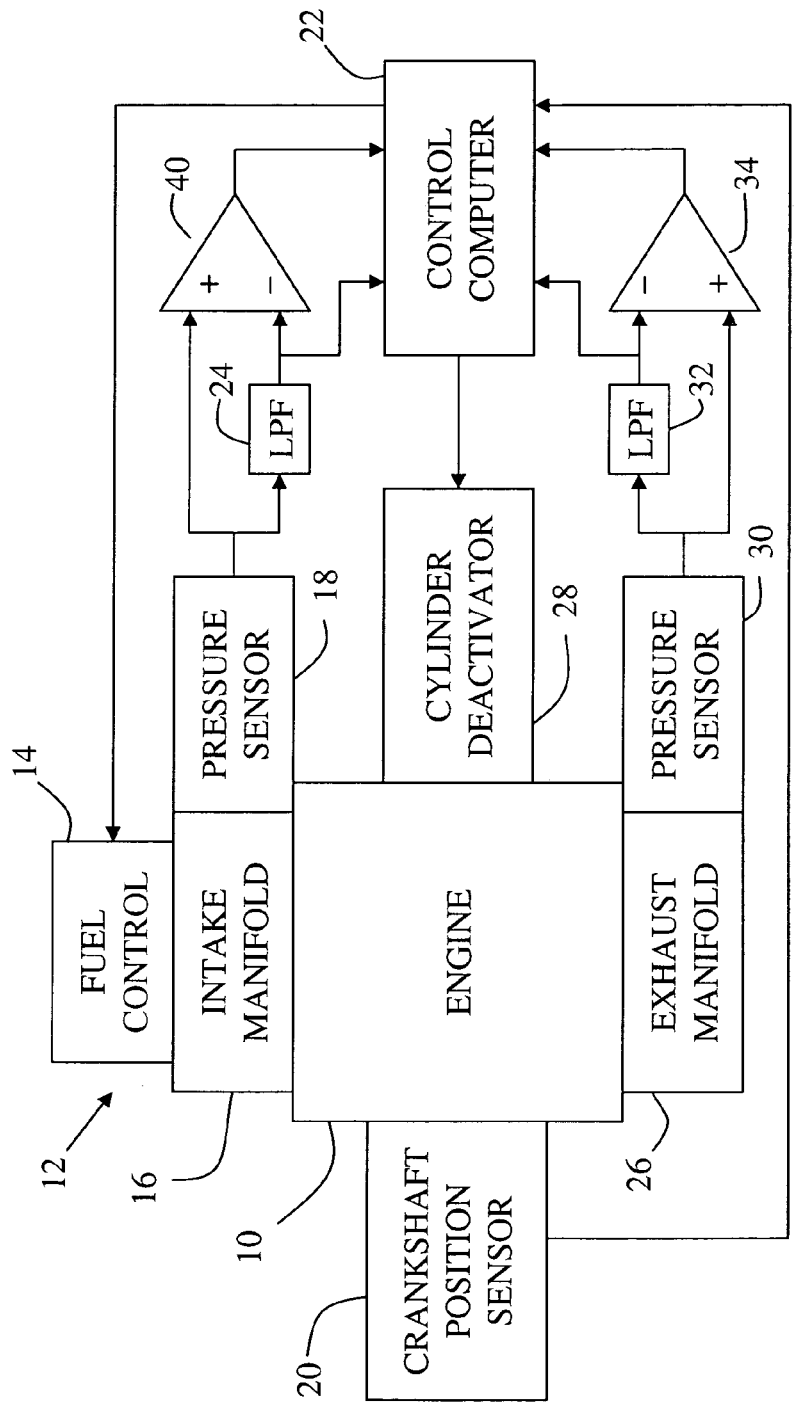
FIG. 1 shows a block diagram of an engine provided with the a system incorporating the method of this invention.

A multi-cylinder internal combustion engine 10 with selectable cylinder de-activation is shown in block diagram form in FIG. 1. The engine may have any number of cylinders but will typically have 4, 6, 8 or 12. In the embodiment shown, the de-activatable cylinders are alternate cylinders in the normal cylinder firing order, which is half the total number of cylinders. But the invention is not limited to this number or arrangement; it is expected to function and provide utility with any engine cylinder de-activation arrangement that works in such an engine.

Engine 10 is provided with an air/fuel charge delivery apparatus 12 for delivering a controlled air/fuel charge to the cylinders of engine 10 in the amounts and at the times necessary for proper operation of the engine. This apparatus can be any known in the art to accomplish this function, and its details will not be described herein except as necessary to understand its interface with the method of this invention. Air/fuel mixture delivery apparatus 12 includes, in this embodiment, a fuel control apparatus 14 for creating an air/fuel mixture, an intake manifold 16 for conducting the mixture to the engine cylinders, a pressure sensor 18 responsive to gas pressure in intake manifold 16, an engine crankshaft position sensor 20 and a control computer 22 responsive to pressure sensor 18 and crankshaft position sensor 20 to provide fuel at the proper times and in the proper amounts for the required air/fuel mixture. The entry of this mixture as an air/fuel charge into each cylinder is controlled by one or more intake valves per cylinder, not shown, that are opened and closed by intake valve control apparatus of engine 10, typically based on an engine driven camshaft, in a predetermined order at times corresponding to predetermined positions of the engine crankshaft. The venting of exhaust gases from each cylinder after ignition of the air/fuel charge therein is likewise controlled by exhaust valves in engine 10, also typically camshaft activated in a predetermined order at times corresponding to predetermined positions of the engine crankshaft. The exhaust gases are typically conducted from engine 10 by means of one or more exhaust manifolds 26.

A cylinder deactivator 28 is capable of deactivating selected ones of the intake valves, responsive to control computer 22, so that they remain closed in a cylinder de-activation mode when they would otherwise be opened in full activation mode. Pressure pulses will occur in the combustion related gases (the air fuel mixture) within intake manifold 16 at times corresponding to activations of the intake valve(s) of each cylinder. During full activation mode, the normal mode with all intake valves operating, these pulses will occur regularly and predictably at times separated by time periods varying with engine speed, as derived from signals from crankshaft position sensor 20. But for any cylinder having a de-activated intake valve, no such pressure pulse will occur; and a time period (or crankshaft angle) between consecutive pressure pulses of cylinders prior to and after the cylinder with the deactivated intake valve will be double that normally produced. In this embodiment, pressure sensor 18 is a manifold absolute pressure (MAP) sensor that provides a raw MAP signal. Raw MAP is an analog signal that is preferably low pass filtered sufficiently to effectively eliminated high frequency noise but not so much as to lose the sine wave-like pulses due to valve activations. The raw MAP signal is further filtered, in this embodiment in a low pass filter (LPF) 24, to provide an average MAP signal input to computer 22 in the normal manner through an A/D converter. The average MAP signal is used in determining the fuel amounts required to maintain a desired air/fuel ratio in the air/fuel mixture within intake manifold 16.

The system of this invention adds, in this embodiment, a comparator 40, the inputs of which are provided with the raw MAP signal from sensor 18 and the filtered (average) MAP signal from low pass filter 24. The apparatus is designed so that the raw MAP signal is higher than the average value except when an intake valve activation generates a pulse in the raw MAP signal, whereupon it drops to cross the average MAP signal and cause the output of comparator 40 to temporarily flip states. Thus the output signal of comparator 40 is a series of pulses indicating intake valve activations. This output signal is provided to computer 22, wherein it is known as MAPPER in the flow chart of FIG. 2 due to the fact that the time period between pulses corresponds to the time period (or crankshaft angle) between intake valve activation events.

In an alternate embodiment, the values of raw MAP and filtered MAP are already available in control computer 22 for use in fuel or other control routines. In this case, comparator 40 is not needed. The comparison of raw MAP and filtered MAP can be done in software as often as required. A software flag can be controlled to indicate which signal is greater in magnitude; and each consecutive change of the flag in a given direction can trigger a subroutine to determine and save the change in crankshaft position (or time) since the last such change in the flag. In actuality, there are many ways to perform the function of detecting and determining the time or crankshaft angles of the peaks in the raw MAP signal that are consistent with this invention; and one of ordinary skill in the art will use the method best suited for the hardware and software in which this invention will be used.

Figure 2:
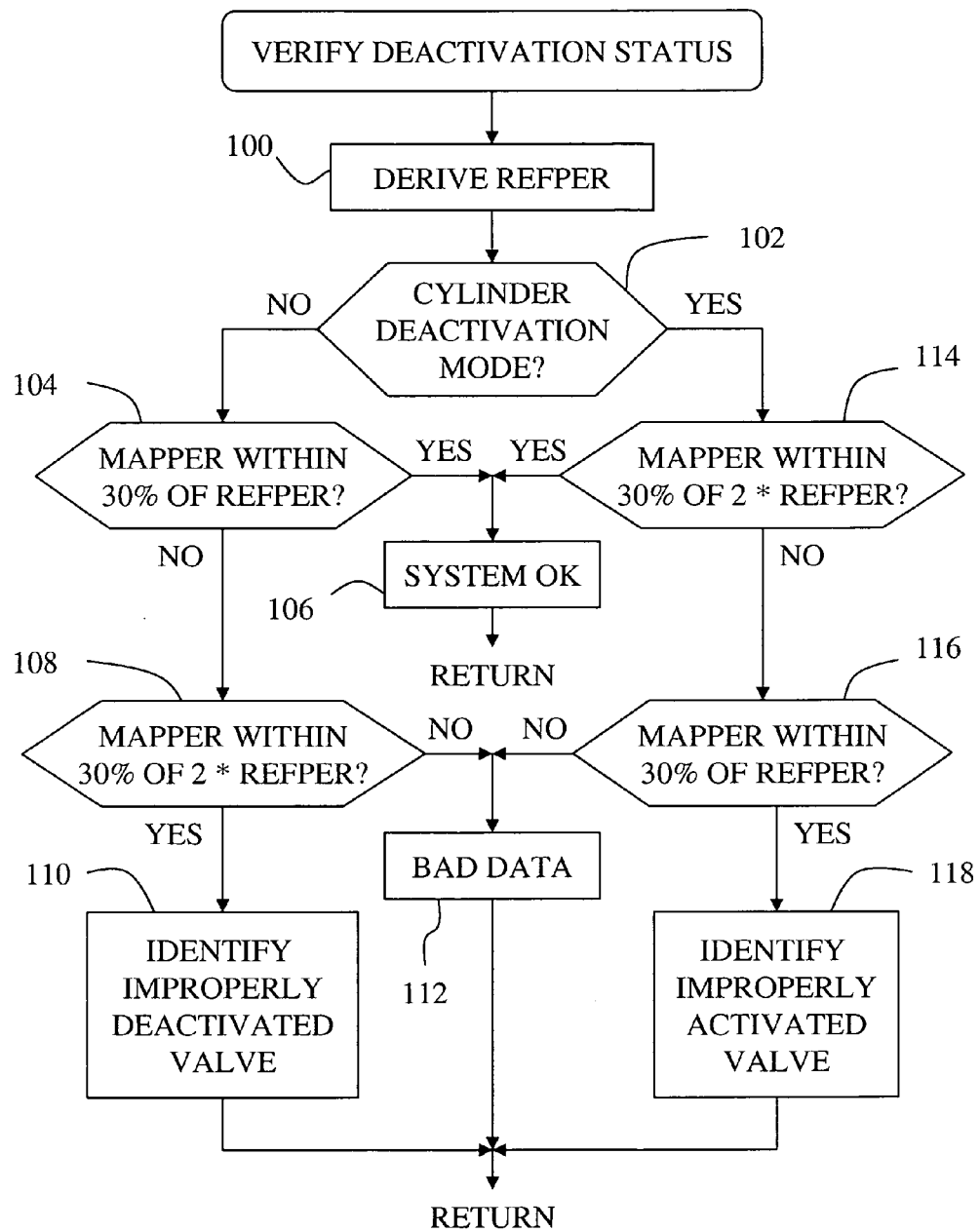
FIG. 2 shows a computer flow chart of a preferred embodiment of the operation of this invention.

The operation of control computer 22 in verifying the correct operation of cylinder deactivator 24 will be described with reference to the flow chart of FIG. 2. This flow chart, for a routine entitled VERIFY DEACTIVATION STATUS, assumes that the variables and/or constants required are available in memory or registers of computer 22. In step 100, a reference period value REFPER is derived. This is a reference time period between successive cylinder firings, and thus successive intake valve activations (assuming one such activation per firing) in normal running mode, with all cylinders activated. If not already available in the computer from another engine control routine, it can be derived from an accurate value of engine speed (typically derived from a crankshaft position sensor) or directly from the crankshaft position pulses from a crankshaft position sensor provided on most electronically controlled engines. This value of REFPER is kept updated for accuracy.

In step 102, the routine determines the cylinder activation mode of the engine. This mode will typically have two possible values: (1) normal mode, in which all cylinders are activated; and (2) cylinder deactivation mode, in which selected cylinders (typically four alternate cylinders in an eight cylinder engine, two alternate cylinders in a four cylinder engine, etc.) are deactivated with the remainder activated. In this typical embodiment, the cylinder activation mode can be represented by a single bit ACTIVATION MODE flag in computer memory.

Figure 3:
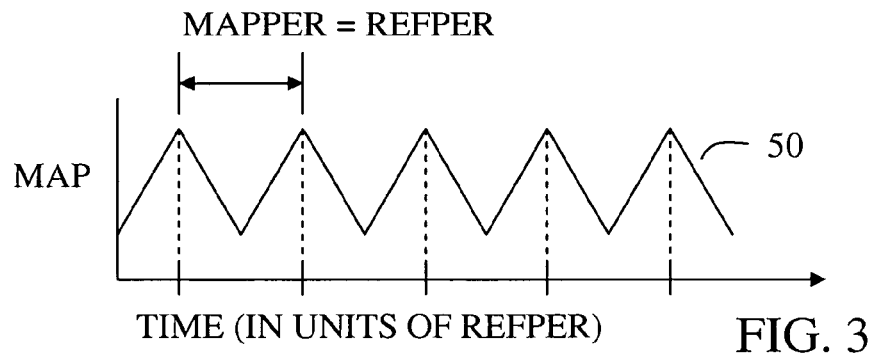
FIGS. 3-5 show graphical approximations of signals illustrating the operation of this invention.
Figure 4:
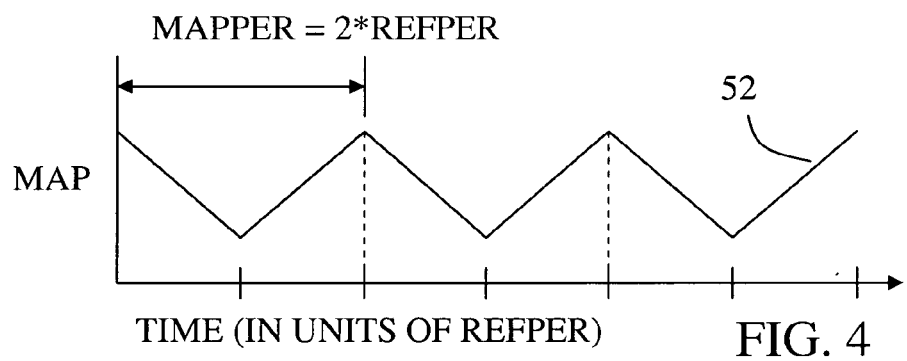

From step 102, if the cylinder activation mode is normal (NO deactivation mode), the routine proceeds to step 104 and determines if the current value of MAPPER is within a predetermined value range of the current value of REFPER. This test basically determines, within a predetermined range of error, whether the measured period between successive intake valve activations is consistent with what it should be in normal operation, with all cylinders firing. The predetermined value range is indicated in the embodiment to be shown as 30 percent (plus or minus), but this is only by example: the actual range will be determined by experiment for best operation of an actual system. If the answer is YES, the routine proceeds to step 106, in which a SYSTEM OK flag is set to verify correct operation; and this cycle of the routine is then ended. Repeated operation through this part of the flow chart corresponds to the situation shown in the curve of FIG. 3, wherein MAP is plotted in curve 50 as a function of time. Each hash mark on the time axis corresponds to a time period corresponding to REFPER in normal operation at a given engine speed. It should be noted that the curve would normally be more like a sine curve but is drawn as an approximate, straight line equivalent that is accurate in showing the timing of the upper peaks. In FIG. 4, each two consecutive upper peaks—and thus each consecutive value of MAPPER, is shown ideally as equal to REFPER. This is the way the curve should appear in normal mode with no valve deactivation.

If the answer at step 104 is NO—that is, the current value of MAPPER is not within the predetermined range of REFPER—the routine proceeds to step 108 and determines whether the current value of MAPPER is within a predetermine range of twice the value of REFPER (2*REFPER). Again, and also for steps yet to be described, the indicated value of 30 percent (plus or minus) is by example and is not intended to be limiting. A value of MAPPER equal to twice the value of REFPER is consistent with an intervening cylinder with a deactivated intake valve. If the answer is YES, then the routine proceeds to step 110 and indicates an error by changing the SYSTEM OK flag to its error indicating value and identifying the improperly deactivated intake valve from existing information in computer 22, derived from the pulses (including an absolute reference pulse) received from the crankshaft position sensor; and this cycle of the routine is then ended. This situation corresponds to the situation shown in curve 54 of FIG. 5, which shows six consecutive periods of time equal to REFPER but only four periods of time (MAPPER) between consecutive peaks. The MAPPER periods are equal to (in time order): 2*REFPER, REFPER, REFPER, 2*REFPER. This curve shows an absence of intake valve activation at every fourth hash mark and thus indicates that the intake valve for every fourth cylinder is deactivated. Given the desired state of no valve deactivation, this indicates an IMPROPERLY DEACTIVATED VALVE.

But it is good programming to make provision for the possibility that the answers to the questions at steps 102 and 106 will both be NO. In that case, the method as described cannot make a reliable decision concerning the status of the cylinder deactivation process. In this embodiment, at step 110, BAD DATA will be indicated; and the value of the SYSTEM OK flag will preferably be left as it is since there is no good data indicating need for a change. This is done at step 112; and this cycle of the routine is then ended.

Returning attention to step 102, if the system is indicated as being in cylinder deactivation mode (YES), the routine proceeds to step 114 and determines whether the current value of MAPPER is within a predetermined range of twice the value of REFPER (2*REFPER). As previously stated, a value of MAPPER equal to twice the value of REFPER is consistent with an intervening cylinder having a deactivated intake valve. If the answer is YES, then the routine proceeds to step 106 and sets the SYSTEM OK flag to verify correct operation; and this cycle of the routine is then ended. This situation repeated corresponds to curve 52 of FIG. 4, wherein each consecutive MAPPER period (peak-to-to peak distance of the MAP curve) is ideally shown as equal to 2*REFPER, which is what is expected in cylinder deactivation mode with the intake valves of alternate cylinders deactivated.

Figure 5:
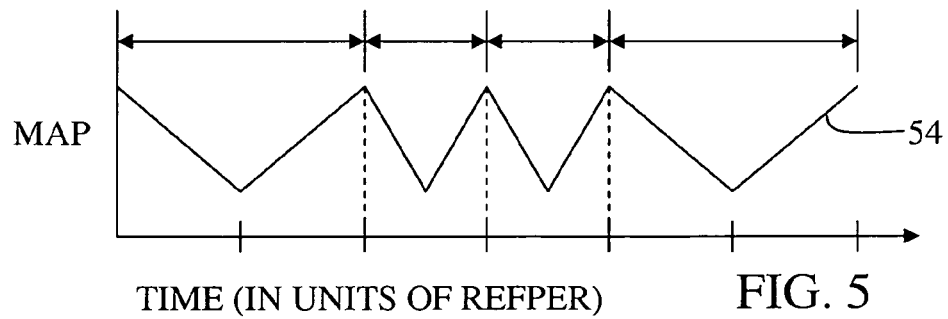

From step 114, if the answer is NO, then the routine proceeds to step 116 and determines if the current value of MAPPER is within a predetermined value range of the current value of REFPER. This test determines, within a predetermined range of error, whether the measured period between successive intake valve activations is consistent with what it should be in normal operation, with all cylinders firing. Since the intake valve of the cylinder is supposed to be deactivated, the routine will respond to a YES at step 116 by proceeding to step 118 to indicate an IMPROPERLY ACTIVATED CYLINDER; and this cycle of the routine is then ended. This situation corresponds to curve 54 of FIG. 5, already described; but since the desired state is cylinder deactivation, it can be seen that one of the cylinders supposedly deactivated is being IMPROPERLY ACTIVATED. The cylinder being improperly activated may be identified as previously described. The curve of FIG. 5 is thus consistent with two different types of incorrect action of the valve deactivation system. In each case, the same three consecutive cylinders have activated intake valves and the same fourth cylinder has a deactivated intake valve. If the desired condition is normal valve activation, clearly the deactivated intake valve is being improperly deactivated and the other three cylinders have properly activated intake valves; but if the desired condition is cylinder deactivation, the middle one of the three cylinders has an improperly activated intake valve and the other three cylinders have properly controlled intake valves.

Alternatively, if the answer at step 116 is NO, then the system proceeds to step 112, wherein BAD DATA is indicated; and the value of the SYSTEM OK flag will preferably be left as it is since there is no good data indicating need for a change. After this is done, this cycle of the routine is ended.

The method of this invention may also be used for exhaust side detection of intake valves, since exhaust valves are normally operated at all times and pressure pulses resulting from intake valve operation and cylinder firing will also produce pressure pulses in the exhaust manifold(s). Referring to FIG. 1, pressure sensor 30 is exposed to the gas pressure in exhaust manifold 26; and its output signal is provided to low pass filter (LPF) 32 and one of the inputs of comparator 34. The output of low pass filter 32 is provided to the other input of comparator 34; and the output of comparator 34 is provided to computer 22 as a digital exhaust gas pressure signal EXPPER, which is the time between consecutive peaks (in the same direction) of the exhaust gas pressure. This process parallels that creating and providing signal MAPPER from comparator 40 but is based on changes in exhaust manifold pressure rather than that of intake manifold pressure. Signal EXPPER is provided to computer 22 and used just as signal MAPPER would be used in the flow chart of FIG. 2. Although it is unlikely that raw and filtered exhaust gas pressure would be already available in computer 22, this process could be done in software comparisons as already described for the generation of MAPPER. Although possible, it is unlikely that both intake manifold pressure (MAP) and exhaust gas pressure would be monitored for this system on the same engine. Rather, one or the other would be chosen as the better alternative. Both are shown on the same engine in FIG. 1 for convenience and economy in this description.

Although shown and described for use in engines having an even number of cylinders (4, 6, 8) with alternate cylinders deactivated together, the system of this invention is easily adapted by software programming to engines of any number of cylinders with any cylinder or combination of cylinders deactivated at one time. It may be installed in vehicles for use in vehicle operation, to provide a diagnostic warning to the vehicle operator or store a diagnostic message in system memory for future service. But it may also be used in engine test stations in engine or vehicle production facilities or in service facilities.

The invention claimed is:

1. In a multi-cylinder internal combustion engine having intake valves and exhaust valves for the cylinders and intake valve deactivation apparatus providing de-activation of selected cylinders during engine operation, a method of verifying correct cylinder activation status comprising the steps:

measuring a gas pressure in a conduit conducting combustion related gases through the cylinders of the engine;

detecting consecutive pulses in the measured gas pressure due to predetermined activations of the intake valves;

determining time periods between the detected consecutive pulses;

sensing changing crankshaft position;

signaling a verified cylinder activation status when the time periods between the detected consecutive pulses corresponds to expected time periods between the predetermined activations of the intake valves based on the sensed crankshaft position; and signaling an error in cylinder activation status when the time periods between the detected consecutive pulses do not correspond to expected time periods between the predetermined activations of the intake valves based on the sensed crankshaft position.

2. The method of claim 1 wherein the conduit is in the intake air passage of the engine.

3. The method of claim 1 wherein the conduit is in an exhaust passage of the engine.

4. The method of claim 1 wherein the step of detecting consecutive pulses further comprises the steps of:

determining an average value of the measured a gas pressure; and comparing the measured and average values of the measured gas pressure.

5. The method of claim 4 wherein the step of detecting consecutive pulses further comprises the step of setting the binary value of a memory bit to a first value when the average value of the gas pressure exceeds the measured value thereof and setting the binary value of the memory bit to a second value when the measured value of the gas pressure exceeds the average value thereof.

6. The method of claim 5 wherein the step of determining time periods between the detected consecutive pulses further comprises measuring times between consecutive transitions of the value of the memory bit in a single predetermined direction.

* * * * *